United States Patent
Sakai et al.

(10) Patent No.: US 11,358,562 B2
(45) Date of Patent: Jun. 14, 2022

(54) AIRBAG BASE CLOTH AND AIRBAG INCLUDING SAME

(71) Applicant: TOYOBO CO., LTD., Osaka (JP)

(72) Inventors: Masahiro Sakai, Otsu (JP); Hirotaka Harada, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 95 days.

(21) Appl. No.: 16/650,335

(22) PCT Filed: Sep. 27, 2018

(86) PCT No.: PCT/JP2018/036044
§ 371 (c)(1),
(2) Date: Mar. 24, 2020

(87) PCT Pub. No.: WO2019/065880
PCT Pub. Date: Apr. 4, 2019

(65) Prior Publication Data
US 2020/0298787 A1 Sep. 24, 2020

(30) Foreign Application Priority Data
Sep. 29, 2017 (JP) .............................. JP2017-191567

(51) Int. Cl.
*B60R 21/235* (2006.01)
*D03D 15/47* (2021.01)
*D03D 15/292* (2021.01)
*D03D 15/44* (2021.01)
*D03D 15/283* (2021.01)
*D03D 13/00* (2006.01)
*D03D 15/37* (2021.01)
*D03D 1/02* (2006.01)
*D01F 6/62* (2006.01)
*D01F 6/60* (2006.01)
*D01F 6/00* (2006.01)

(52) U.S. Cl.
CPC .............. *B60R 21/235* (2013.01); *D01F 6/00* (2013.01); *D01F 6/60* (2013.01); *D01F 6/62* (2013.01); *D03D 1/02* (2013.01); *D03D 13/008* (2013.01); *D03D 15/283* (2021.01); *D03D 15/292* (2021.01); *D03D 15/37* (2021.01); *D03D 15/44* (2021.01); *D03D 15/47* (2021.01); *B60R 2021/23509* (2013.01); *B60R 2021/23542* (2013.01); *D10B 2331/02* (2013.01); *D10B 2331/04* (2013.01); *D10B 2505/124* (2013.01)

(58) Field of Classification Search
CPC .......... B60R 2021/23509; B60R 2021/23542; B60R 21/16; B60R 21/235; D01F 6/00; D01F 6/60; D01F 6/62; D03D 13/008; D03D 15/283; D03D 15/37; D03D 1/02; D10B 2331/02; D10B 2331/04; D10B 2505/124
See application file for complete search history.

(56) References Cited

U.S. PATENT DOCUMENTS

| | | |
|---|---|---|
| 2003/0148683 A1 | 8/2003 | Kitamura et al. |
| 2007/0184733 A1 | 8/2007 | Manley |
| 2015/0247283 A1 | 9/2015 | Akechi |
| 2015/0329998 A1 | 11/2015 | Ise |
| 2017/0136982 A1 | 5/2017 | Akechi |
| 2018/0281737 A1* | 10/2018 | Houraiya .................. D03D 1/02 |

FOREIGN PATENT DOCUMENTS

| | | |
|---|---|---|
| CN | 102534926 | 7/2012 |
| CN | 104619908 | 5/2015 |
| CN | 106029452 | 10/2016 |
| EP | 2042628 | 4/2009 |
| EP | 2617881 | 7/2013 |
| EP | 2684746 A1 | 1/2014 |
| EP | 3118358 A1 | 1/2017 |
| JP | H06-146132 A | 5/1994 |
| JP | 2003-171843 A | 6/2003 |
| JP | 2003171843 | 6/2003 |
| JP | 2001-032145 A | 1/2006 |
| JP | 2007-224486 A | 9/2007 |
| JP | 2007224486 | 9/2007 |
| JP | 2010-203023 A | 9/2010 |
| JP | 2015-110857 A | 6/2015 |
| WO | 2017/057300 A1 | 4/2017 |

(Continued)

OTHER PUBLICATIONS

Office action in Chinese Appln. No. 201880062795.5, dated Dec. 15, 2020, 14 pages, with English Translation.
Japan Patent Office, International Search Report for PCT/JP2018/036044 dated Dec. 4, 2018 with English translation.
Third Party Observation dated Sep. 27, 2018 for PCT application No. PCT/JP2018/036044.
EPO Communication with Extended European Search Report and Search Opinion in European Appln. No. 18860503.4, dated May 14, 2021, 12 pages.

(Continued)

*Primary Examiner* — Arti Singh-Pandey

(74) *Attorney, Agent, or Firm* — Fish & Richardson P.C.

(57) ABSTRACT

Provided is an airbag base fabric that has a low air permeability sufficient to ensure the safety of occupants and heat resistance sufficient to withstand high-power, high-temperature gas generated from a recent downsized inflator, and that is capable of being packaged compactly. Also provided is an airbag comprising the base fabric. An airbag base fabric comprising a synthetic fiber multifilament having a total fineness of 500 to 750 dtex, the airbag base fabric having an areal weight of 225 to 245 g/m$^2$, air permeability at 20 kPa of 0.2 to 0.8 L/cm$^2$/min, and edgecomb resistance according to the ASTM D 6479 method of 300 to 600 N in both warp and weft directions.

12 Claims, No Drawings

(56) References Cited

FOREIGN PATENT DOCUMENTS

| WO | WO 2017057300 | 4/2017 |
|----|---------------|--------|
| WO | WO 2019065880 | 9/2020 |

\* cited by examiner

AIRBAG BASE CLOTH AND AIRBAG INCLUDING SAME

TECHNICAL FIELD

The present invention relates to an airbag base fabric and an airbag comprising the base fabric.

BACKGROUND ART

In recent years, airbags have been widely used as safety equipment for occupant protection in the event of vehicle collision. For an airbag base fabric, those obtained by coating the surface of woven fabric with silicone rubber etc. have been used to ensure low air permeability sufficient to prevent leakage of inflator gas. However, while coated airbags, which comprise such a surface-coated woven fabric, have advantages in terms of high heat resistance, in addition to low air permeability, they also have disadvantages in that they are heavy and thick and require considerably increased costs due to the coating treatment. This makes it difficult for coated airbags to meet market demands, such as lighter weight and smaller size. For this reason, an airbag comprising a non-coated airbag base fabric without surface coating, i.e., a non-coated airbag, has recently been studied.

Further, in recent years, airbags themselves have been required to be lighter and smaller. Along with this, inflators have also been required to be smaller. However, downsizing an inflator will result in higher output and higher temperature of the generated gas, which causes a concern in terms of formation of a hole in the airbag due to the gas during deployment. If a hole is formed in an airbag, high-temperature and high-pressure gas will blow out from the hole, causing not only the risk of burns to the occupant's face but also bursting of the airbag during deployment, which also causes a concern of being unable to exert the desired function of protecting occupants.

As a technique for solving the above problems, a technique is known in which the heat resistance is improved by crosslinking the constituent yarns by irradiating the surface of an uncoated airbag base fabric with an electron beam (e.g., Patent Literature (PTL) 1). However, such a technique not only increases the costs due to the equipment introduction for electron beam irradiation and due to an increase in the number of steps, but also causes a risk of reduction in the tensile strength of the airbag base fabric due to crosslinking.

In addition, a technique is known in which heat resistance is improved by absorbing the heat of gas during deployment by increasing the surface area of the yarn that appear on the surface of an airbag base fabric by using flat cross-section yarn (e.g., PTL 2). However, flat cross-section yarn has a low strength relative to fineness, compared with round cross-section yarn; thus, airbag base fabrics obtained by using such yarn may have a reduced tensile strength. Additionally, it is difficult to reduce the fineness of flat cross-section yarn, compared with round cross-section yarn; if the fineness cannot be sufficiently reduced, packageability may worsen.

CITATION LIST

Patent Literature

PTL 1: JPH06-146132A
PTL 2: JP2003-171843A

SUMMARY OF INVENTION

Technical Problem

The present invention has been accomplished in view of the problems of the conventional techniques. An object of the present invention is to provide an airbag base fabric that has low air permeability sufficient to ensure the safety of occupants, and heat resistance sufficient to withstand high-power and high-temperature gas generated from a recent downsized inflator, and that is capable of being packaged compactly, as well as providing an airbag comprising the airbag base fabric.

Solution to Problem

As a result of extensive research, the present inventors found that the above problems can be solved by the following measures. The present invention has thus been completed. Specifically, the inventors have succeeded in providing an airbag base fabric that exhibits excellent heat resistance and excellent packageability when used in an airbag, and that is capable of being produced to have a light weight inexpensively by adjusting the total fineness of a synthetic fiber multifilament that constitutes the base fabric, the areal weight, air permeability, and edgecomb resistance of the base fabric to be within specific ranges. More specifically, the present invention has the following features.

Item 1. An airbag base fabric comprising a synthetic fiber multifilament having a total fineness of 500 to 750 dtex, the airbag base fabric having an areal weight of 225 to 245 g/m$^2$, air permeability at 20 kPa of 0.2 to 0.8 L/cm$^2$/min, and edgecomb resistance according to the ASTM D 6479 method of 300 to 600 N in both warp and weft directions.

Item 2. The airbag base fabric according to Item 1, wherein the airbag base fabric has a weave density of 35 to 55 yarns/2.54 cm in both warp and weft directions.

Item 3. The airbag base fabric according to Item 1 or 2, wherein the synthetic fiber is at least one synthetic fiber selected from the group consisting of polyamide fibers and polyethylene terephthalate fibers.

Item 4. The airbag base fabric according to any one of Items 1 to 3, wherein a single yarn of the synthetic fiber has a cross-sectional shape having an aspect ratio of 1.4 or less.

Item 5. An airbag comprising the airbag base fabric of any one of Items 1 to 4.

Item 6. The airbag according to Item 5, which is a non-coated airbag.

Advantageous Effects of Invention

The airbag base fabric of the present invention exhibits the following effects; specifically, the airbag base fabric of the present invention, when used for an airbag, has low air permeability sufficient to ensure the safety of occupants and heat resistance sufficient to withstand high-power and high-temperature gas generated from a recent downsized inflator, and is capable of being packaged compactly into a module.

DESCRIPTION OF EMBODIMENTS

1. Airbag Base Fabric

The airbag base fabric of the present invention is a fabric comprising a synthetic fiber multifilament.

The synthetic fiber multifilament has a total fineness of 500 to 750 dtex, and preferably 530 to 700 dtex. When the total fineness is 500 dtex or more, an airbag base fabric woven to achieve the areal weight described later does not necessarily have an overly high weave density, thus suppressing an excessive increase in the restraining force of the warp yarn and weft yarn, which makes it easy to maintain the packageability into a module within an appropriate range. Additionally, when the total fineness is 500 dtex or more, the multifilament has greater heat capacity, thus obtaining sufficient heat resistance without excessively increasing the weave density. On the other hand, when the total fineness is 750 dtex or less, an excessive increase in the rigidity of the constituent yarn itself is easily suppressed. Accordingly, when the total fineness of the synthetic fiber multifilament is 500 to 750 dtex, an airbag base fabric that is appropriately flexible and thus has excellent packageability into a module is easily obtained.

In the present invention, the total fineness is determined as follows. The warp yarn and weft yarn of the base fabric obtained through a dry finishing process are each fibrillated, and measurement is performed in accordance with JIS L 1013 (2010) 8.3.1, method B (simplified method). Specifically, a sample having a length of 90 cm is accurately taken while a load of 1/11.1 of a dtex of the sample for measurement is applied as an initial load (g), the absolute dry mass is weighed, and a fineness based on corrected weight (dtex) is calculated by the following equation. The average value of 5 measurements is considered to be the total fineness.

$$F0 = 10000 \times m/L \times (100+R0)/100$$

F0: Fineness based on corrected weight (dtex); L: Sample length (m); m: Absolute dry mass of sample (g); and R0: Official moisture content (%)

The airbag base fabric of the present invention has an areal weight of 225 to 245 $g/m^2$, preferably 230 to 240 $g/m^2$, and more preferably 232 to 235 $g/m^2$. When the areal weight is 225 $g/m^2$ or more, sufficient heat resistance can be imparted to the airbag base fabric. On the other hand, when the areal weight is 245 $g/m^2$ or less, the weight is easily made lighter, while improving the packageability into a module.

In the present invention, the areal weight is determined in accordance with JIS L 1096 (2010) 8.3.2. Three test pieces (about 200 mm×200 mm) are taken from a sample, the absolute dry mass (g) of each test piece is weighed, and the mass ($g/m^2$) per 1 $m^2$ is calculated. The average value is considered to be the areal weight.

The airbag base fabric of the present invention has air permeability at 20 kPa of 0.2 to 0.8 $L/cm^2/min$, and preferably 0.3 to 0.7 $L/cm^2/min$. When the air permeability is 0.8 $L/cm^2/min$ or less, it is easy to ensure adjustment margins for vent holes when used in an airbag module. When the air permeability is 0.2 $L/cm^2/min$ or more, the internal pressure of the airbag can be sufficiently maintained during deployment to protect the occupants.

In the present invention, the air permeability is measured at a pressure of 20 kPa with a high-pressure air permeability measuring device (OEM Systems Co., Ltd., or an equivalent device).

The airbag base fabric of the invention has edgecomb resistance according to the ASTM D 6479 method of 300 to 600 N, and preferably 300 to 550 N, in both warp and weft directions. When the edgecomb resistance is 300 N or more, excessive stitch opening of the airbag base fabrics is suppressed when the airbag is deployed, and the risk of bursting is easily avoided. The upper limit of edgecomb resistance is not particularly limited; however, to improve edgecomb resistance, the weave density must be increased. If the weave density is increased, the packageability is reduced accordingly. Therefore, the edgecomb resistance is preferably 600 N or less, and more preferably 550 N or less, from the viewpoint of packageability.

The airbag base fabric of the present invention preferably has a weave density of 35 to 55 yarns/2.54 cm, and more preferably 40 to 50 yarns/2.54 cm, in both warp and weft directions. When the weave density is 35 yarns/2.54 cm or more, gaps between fibers are unlikely to be formed in the airbag base fabric that is woven to achieve the areal weight mentioned above; therefore, a significant increase in the air permeability is easily suppressed while significant deterioration of edgecomb resistance is easily suppressed. Additionally, when the weave density is 35 yarns/2.54 cm or more, the multifilaments present per unit area of woven fabric are increased to exert sufficient heat resistance. On the other hand, when the weave density is 55 yarns/2.54 cm or less, weaving is easily performed, and an excessive increase in the stiffness of the airbag base fabric is easily avoided, improving the packageability into a module.

In the present invention, the weave density is determined in accordance with JIS L 1096 (2010) 8.6.1, method A (JIS method). More specifically, a sample is placed on a flat table, and unnatural wrinkles and tension are removed. Then, for the warp yarn, a region from which 1/10 of the total width is excluded from the edges is divided into 5 almost equal parts, a mark (10 cm) is placed on each part, and the number of yarns within the 10-cm marks is counted. For the weft yarn, 5 locations are marked (10 cm) in the warp direction, and the number of yarns within the 10-cm marks is counted. Each number of the warp and weft yarns are counted within the 10 cm-marked sections at 5 different locations, and each average value is calculated based on the unit length, which is considered to be the density.

A single yarn of the synthetic fiber multifilament constituting the airbag base fabric of the present invention has a cross-sectional shape having an aspect ratio of preferably 1.4 or less. The cross-sectional shape of a single yarn constituting an airbag base fabric may undergo a change into a shape different from the cross-sectional shape of the single yarn of the original yarn due to the tension etc. during processing. When the cross-sectional shape of the single yarn of the constituent yarn of the airbag base fabric has an aspect ratio of 1.4 or less, the cross-section of the yarns is orderly aligned in a predetermined direction when the airbag is folded, so that the desired low air permeability is easily obtained.

In the present invention, the aspect ratio of the cross-sectional shape of the single yarn is determined as follows. The warp and weft yarns of the base fabric obtained through a dry finishing process are each fibrillated to take SEM photographs of their fiber cross-sections, and the lengths of long and short axes of 10 randomly selected single yarns are measured. The aspect ratio is determined by calculating the average value.

The airbag base fabric of the present invention has stiffness determined in accordance with JIS L 1096 (2010) 8.21.1, method A (45° C. cantilever method), of preferably 80 to 100 mm, and more preferably 90 to 100 mm, as an average value in the warp and weft direction. The stiffness is preferably smaller, but a stiffness of 80 mm or more is only feasible. When the stiffness is 100 mm or less, the airbag base fabric does not easily have excessive hardness, and fold lines are easily formed, improving the packageability into a module.

In the present invention, the measurement of the stiffness determined in accordance with JIS L 1096 (2010) 8.21.1, method A (45° C. cantilever method) is specifically performed as follows. Five test pieces (about 20 mm×about 150 mm) are taken from a sample in both vertical and horizontal directions, and each test piece is placed on a smooth horizontal surface having a 45° slope at one end so that the short side of the test piece is placed to align with the scale base line. Next, the test piece is allowed to gently slide in the direction towards the slope using an appropriate method, and when the central point of one end of the test piece touches the slope, the position of the other end is read from the scale. The stiffness is represented by the length (mm) in which the test piece moves, and the measurement is performed for the front and back surfaces of each of the 5 sample pieces.

The airbag base fabric of the present invention has a packageability of preferably 2300 cm$^3$ or less, and more preferably 2250 cm$^3$ or less, as determined by the test for packageability specified in ASTM D6478, from the viewpoint of light weight and high packageability. From the viewpoint of light weight and high packageability, the lower limit of the packageability is not particularly limited; a general-purpose airbag base fabric has a packageability of preferably 1900 cm$^3$ or more, and more preferably 2100 cm$^3$ or more.

In the present invention, the packageability test according to ASTM D 6478 is specifically performed as follows. A test piece with a width of 750±5 mm (weft direction) and a length of 800 mm±5 mm (warp direction) is taken from a sample, a plate with a width of 145 mm and a thickness of 2 mm is placed along the edge of the sample in the warp direction, and the sample is folded along the warp yarns. This procedure is repeated 5 times to make a bellows. The plate is removed, and the folded sample is rotated at 90°. A plate with a width of 95 mm and a thickness of 2 mm is placed along the edge of the sample in the weft direction, and this time, the woven fabric is folded along the weft yarns. This procedure is repeated 7 times to make a bellows. The folded sample is placed in a storage box with an inner dimension at the bottom of 100 mm×150 mm, the bulkiness (thickness) of the folded sample when a specific load is applied from the above is measured, and the packageability (cm$^3$) is calculated by the following equation. The average value of 2 measurements is considered to be the packageability.

$$[T20+T40+T60+ \ldots T180]*100*150/1000 \text{ (cm}^3\text{)}$$

(T$\alpha$: Bulkiness of the sample under the load of $\alpha$N (mm); $\alpha$ is measured in increments of 20.)

The airbag base fabric of the present invention has a tensile strength of preferably 750 N/cm or more, and more preferably 800 N/cm or more, from the viewpoint of mechanical characteristics. The upper limit of tensile strength is not particularly limited, and the tensile strength is preferably 1000 N/cm or less, and more preferably 900 N/cm or less, considering the relationship between the total fineness and the tensile strength of the synthetic fiber multifilament, and the weave density of the airbag base fabric.

In the present invention, the tensile strength of the base fabric is measured in accordance with JIS L 1096 (2010) 8.14.1, method A (strip method). Specifically, a test piece is held not loosely with a tensile tester. The test piece having a width of 50 mm is prepared by removing the yarns at the regions 2.5 mm from each side of a cut piece having a width of 55 mm. The test is performed under the conditions of a grip interval of 200 mm, tensile rate of 200 m/min, and cushioning material of rubber, to measure the strength (N) at the time that the sample is cut. However, those that are cut within 10 mm from the grip or those that are abnormally cut are excluded.

Further, the airbag base fabric of the present invention has an elongation at maximum force of preferably 23% or more. In an airbag base fabric, elongation is different in the warp and weft direction. Therefore, if the elongation at maximum forces in the warp and weft direction of the airbag base fabric are both 23% or more, the stress does not easily concentrate on a site with a small elongation when the airbag is deployed, making it possible to maintain a predetermined internal pressure when the airbag is deployed. The elongation at maximum force of the airbag base fabric is more preferably 25% or more, and still more preferably 26% or more. The elongation at maximum force is preferably higher. In practice, however, the elongation at maximum force is preferably 40% or less, and more preferably 38% or less.

In the present invention, the elongation at maximum force of the base fabric is measured in accordance with JIS L 1096 (2010) 8.14.1, method A (strip method). Specifically, a test piece is held not loosely with a tensile tester. The test piece having a width of 50 mm is prepared by removing the yarns at the regions 2.5 mm from each side of a cut piece having a width of 55 mm. The test is performed under the conditions of a grip interval of 200 mm, tensile rate of 200 m/min, and cushioning material of rubber, to measure the elongation (%) at the time that the sample is cut. However, those that are cut within 10 mm from the grip or those that are abnormally cut are excluded.

The material of the synthetic fiber multifilament constituting the airbag base fabric of the present invention is not particularly limited and can be selected widely. To satisfy the properties mentioned above and from an economical viewpoint, a multifilament comprising a polyamide resin, such as nylon 6, nylon 66, and nylon 46, or a multifilament comprising a polyester resin mainly composed of polyethylene terephthalate is preferred. Among these, a multifilament composed of nylon 66 or nylon 46 is particularly preferred from the viewpoint of heat capacity and flexibility.

In this specification, the "synthetic fiber multifilament constituting the airbag base fabric of the present invention" refers to constituent yarns, i.e., fibers obtained by fibrillating the airbag base fabric of the present invention, and is distinguished from the synthetic fiber multifilament as the original yarn for use in the production of the airbag base fabric of the present invention. That is, the properties of the constituent yarn may undergo a change from the properties of the original yarn during the production process of the airbag base fabric. Even in this case, other properties are common between the constituent yarn and the original yarn.

The synthetic fiber multifilament constituting the airbag base fabric of the present invention may contain various additives that are usually used to improve the productivity or properties in the production process of the original yarn or in the production process of the base fabric. For example, the synthetic fiber multifilament constituting the airbag base fabric of the present invention may contain at least one member selected from the group consisting of heat stabilizers, antioxidants, light stabilizers, smoothing agents, antistatic agents, plasticizers, thickening agents, pigments, and flame retardants.

The synthetic fiber multifilament constituting the airbag base fabric of the present invention preferably has a higher tensile strength from the viewpoint of mechanical characteristics. Specifically, the tensile strength is preferably 7.0 cN/dtex or more, more preferably 7.5 cN/dtex or more, and still more preferably 8.0 cN/dtex or more. The upper limit of the tensile strength is not particularly limited. When nylon 66 fibers are used, and the tensile strength is 10.0 cN/dtex, the effects of the present invention can be exhibited.

In the present invention, the tensile strength of the synthetic fiber multifilament is measured as follows. The sample is held loosely with the grip of a tensile tester using tarpaulin as a cushioning material, a load of 1/11.1 of a dtex of the sample for measurement is applied as an initial load (g), and the test is performed under the conditions of a grip interval of 200 mm and a tensile rate of 200 m/min to measure the load at the time that the sample is cut.

The elongation at maximum force of the synthetic fiber multifilament constituting the airbag base fabric of the present invention is preferably 15% or more. In an airbag base fabric, elongation is different in the warp and weft direction. When the elongation at maximum force of the synthetic fiber is 15% or more, the stress does not easily concentrate on a site with a small elongation when the airbag is deployed, making it possible to maintain a predetermined internal pressure when the airbag is deployed. The elongation at maximum force of the multifilament is more preferably 18% or more, and still more preferably 20% or more. The elongation at maximum force is preferably relatively higher. In practice, however, the elongation at maximum force is preferably 30% or less, and more preferably 25% or less.

In the present invention, the elongation at maximum force of the synthetic fiber multifilament is measured as follows. The sample is held loosely with the grip of a tensile tester using tarpaulin as a cushioning material, a load of 1/11.1 of a dtex of the sample for measurement is applied as an initial load (g), and the test is performed under the conditions of a grip interval of 200 mm and a tensile rate of 200 m/min to measure the elongation at the time that the sample is cut.

The synthetic fiber multifilament constituting the airbag base fabric of the present invention is preferably substantially a non-twisted or soft-twisted yarn, and more preferably a non-twisted yarn. When the synthetic fiber multifilament is substantially a non-twisted or soft-twisted yarn, the single yarns constituting the synthetic fiber are not prevented from spreading, and the air permeability of the airbag base fabric can be lowered.

The fineness of the single yarn constituting the synthetic fiber multifilament constituting the airbag base fabric of the present invention is not particularly limited. The fineness is preferably 5.0 dtex or less to ensure spinning operability and packageability of the airbag. The fineness of the single yarn is preferably 2.0 dtex or more, and more preferably 2.4 dtex or more.

Examples of the woven structure of the airbag base fabric of the present invention include plain weave, twill weave, satin weave, and a variation of these structures. Among these, plain weave, which has excellent mechanical characteristics, is preferred.

2. Method for Producing Airbag Base Fabric 2.1 Original Yarn

The original yarn for use in the production of the airbag base fabric of the present invention may be a synthetic fiber multifilament that can be obtained by spinning a synthetic resin through a die by a general-purpose melt spinning method. The spinning conditions differ depending on the type of synthetic resin (polymer) serving as a starting material of the synthetic fiber multifilament, and appropriately selected in consideration of the viscosity, thermal properties, etc. of the polymer. In general, to prevent the polymer from being deteriorated by heat, it is preferable to shorten the residence time of the polymer in the spinning machine, which is usually preferably within 10 minutes. More preferably, the time of about 1 to 5 minutes is recommended.

For example, when fiber is produced by using polyethylene terephthalate, polyhexamethylene adipamide, or the like as a starting material, it is preferable that the spinning temperature be adjusted to 280 to 310° C., and that a heating cylinder with a length of about 5 to 50 cm having an adjusted temperature of about 200 to 350° C. and adjusted relative humidity of about 85% be provided immediately below the die for the polymer to pass through inside the cylinder. By allowing the polymer to pass through the heating cylinder, solidification of the molten polymer can be delayed to achieve high strength. The conditions such as length, temperature, and relative humidity of the heating cylinder are optimized according to the fineness of the obtained single yarn constituting the fiber, the number of single yarns, and the like. It is also effective to seal the atmosphere of the heating cylinder with a high-temperature inert gas as necessary in order to suppress thermal deterioration that is caused by an increase in the temperature in the heating cylinder.

Next, after the spun yarn passes through the high-temperature atmosphere as described above, the yarn is then cooled and solidified with cold air. Subsequently, after an oil agent is applied, the spun yarn is taken up by a take-up roll that controls the spinning speed. The unstretched yarn taken up by the take-up roll is usually stretched successively; however, it is also possible that stretching is performed in a separate step after the yarn is wound up. The spinning speed is usually 2000 m/min or less, and stretching can be performed by thermal stretching of a usual method. Stretching is preferably performed by multi-step stretching of two or more steps. The stretching magnification ratio varies according to the birefringence of the unstretched yarn, the stretch temperature, the stretch ratio distribution for multi-step stretching, etc., and is preferably 1.5 to 6.0, and more preferably 2.0 to 5.5.

Next, the stretched fiber can be subjected to heat setting according to a usual method. At this time, the tension and temperature during heat setting may be modified.

In the stretching step and the heat setting step above, the running yarn may be subjected to entangling. The entangling can be performed by a known method, such as air entangling. When air entangling is performed, for example, a suitable degree of entangling can be achieved by appropriately modifying the air pressure according to the fineness or tension of the yarn used.

Tensile Strength of Yarn

The tensile strength of the synthetic fiber multifilament as the original yarn for use in the production of the airbag base fabric of the present invention is preferably higher in terms of mechanical characteristics. The tensile strength is preferably 7.0 cN/dtex or more, more preferably 7.5 cN/dtex or more, and still more preferably 8.0 cN/dtex or more. The upper limit of the tensile strength is not particularly limited. When nylon 66 fibers are used, the tensile strength is preferably 9.0 cN/dtex or less in terms of the production of the original yarn.

Elongation at Maximum Force of Yarn

The elongation at maximum force of the synthetic fiber multifilament as the original yarn for use in the production of the airbag base fabric of the present invention is preferably 15% or more, more preferably 18%, and still more preferably 20% or more. When the elongation at maximum force of the multifilament is 15% or more, in the base fabric obtained after weaving, the stress does not easily concentrate on a site with a small elongation when the airbag is deployed, making it possible to maintain a predetermined internal pressure during deployment. The elongation at maximum force is preferably relatively higher; however, it is preferably 30% or less, and more preferably 25% or less, in terms of the production of the original yarn.

In the present invention, the tensile strength and elongation at maximum force of the yarn are measured as follows. The sample is held loosely with the grip of a tensile tester using tarpaulin as a cushioning material, a load of 1/11.1 of a dtex of the sample for measurement is applied as an initial load (g), and the test is performed under the conditions of a grip interval of 200 mm and a tensile rate of 200 m/min to measure the elongation at the time that the sample is cut.

Boiling Water Shrinkage Percentage

The boiling water shrinkage percentage of the synthetic fiber multifilament as the original yarn for use in the production of the airbag base fabric of the present invention is preferably 5% or more, and more preferably 8% or more, to reduce the air permeability. If the boiling water shrinkage percentage is too high, the airbag base fabric may become thicker after shrinkage processing. Thus, from the viewpoint of packageability into a module, the boiling water shrinkage percentage of the synthetic fiber multifilament as the original yarn is preferably 15% or less, and more preferably 12% or less. By setting the boiling water shrinkage percentage within this range, an airbag base fabric having low air permeability and excellent packageability into a module can be obtained by the shrinkage treatment described later.

In the present invention, the boiling water shrinkage percentage of yarns is measured in accordance with JIS L 1013 (2010) 8.18.1, the dimensional change rate by boiling water (method B). Specifically, the measurement is performed as follows. A load of 1/11.1 of a dtex of the sample for measurement is applied as an initial load (g) to the sample, the initial load is removed after two points that are 500 mm apart from each other are marked, and the sample is immersed in hot water at 100° C. for 30 minutes. Thereafter, the sample is removed, the water is drained lightly with blotting paper or cloth, the sample is air-dried, and then the initial load is applied again. The length between the two points above is measured to determine the dimensional change rate by boiling water (%) by the following equation. The average value of 3 measurements is considered to be the boiling water shrinkage percentage.

$$\Delta L = (L-500)/500 \times 100$$

$\Delta L$: boiling water shrinkage percentage (%); L: Length between two points (mm)

Aspect Ratio of Single Yarn

From the viewpoint of ease of spinning technology and quality, the cross section of the single yarn constituting the original yarn for use in the production of the airbag base fabric of the present invention is preferably round. The round cross section as used herein refers to a cross-sectional shape having an aspect ratio (long/short diameter of fiber cross-section) of 1.1 or less. When the single yarn cross-section is round in the original yarn, spinning is easy and fluff does not easily occur even when stretching is performed to improve the strength of the original yarn, compared with the original yarn composed of a single yarn with an irregular cross-section, such as flat cross-section and square cross-section.

In the present invention, the aspect ratio of the cross-sectional shape of the single yarn is determined from SEM photographs. The fiber cross-section is photographed by SEM, and the long axis length and short axis length of 10 randomly selected single yarns are measured. By calculating the average value, the aspect ratio is determined.

2.2 Weaving Method

By weaving the original yarns described above, the airbag base fabric of the present invention is obtained.

To obtain a woven fabric using the above synthetic fiber multifilament, weaving is performed by a general-purpose method using the synthetic fiber multifilament as is as warp and weft yarns. At this time, it is preferable that the yarns are not twisted or glued. By omitting these steps, the single yarns of the warp and weft yarns constituting the woven fabric are easily spread, achieving low air permeability.

The loom used in the production process of the airbag base fabric of the present invention is not particularly limited. Examples of usable looms include a water-jet loom, an air-jet loom, a rapier loom, a projectile loom, and the like. A water-jet loom and air-jet loom are particularly preferred in consideration of, for example, woven productivity, reduction of damage to the original yarns, and non-necessity of warp glue. To facilitate removal of the oil agent used for the original yarns and the oil agent used in warping during processing, a water-jet loom, in which almost all of these oil agents can be removed with water during weaving, is most preferred because the scouring step can be simplified.

The warp tension during weaving of the airbag base fabric of the present invention is preferably 50 to 115 cN/yarn. When the warp tension is 50 cN/yarn or more, the warp yarn during weaving is less likely to become loosened, which is less likely to cause defects in the fabric or halting the loom. On the other hand, when the warp tension is 115 cN/yarn or less, application of an excessive load to the warp can be easily avoided, thus not easily resulting in defects of the fabric.

Next, the obtained woven fabric is subjected to shrinkage processing and then dried, thus obtaining the airbag base fabric of the present invention.

Examples of shrinkage processing include hot water processing and heat setting processing typified by a pin tenter. For shrinkage processing, hot water processing using hot water is preferred. When using hot water, a method of immersing the fabric obtained by the above weaving in hot water or a method of spraying hot water on the woven fabric can be used. The temperature of the hot water is preferably about 80 to 100° C., and more preferably 95° C. or higher. The woven fabric obtained by weaving may be subjected to shrinkage processing after once being dried. In terms of production costs, it is advantageous to subject the woven fabric obtained by weaving to shrinkage processing without drying, and then subject it to dry finishing.

The heating temperature of the drying treatment in the production process of the airbag base fabric of the present invention is not particularly limited, and is usually 80 to 200° C., and preferably 160° C. or lower. If necessary, calendar processing, resin processing, coating processing, etc. may be performed after drying as long as the effects of the present invention are not impaired.

The airbag comprising the base fabric for airbags of the present invention is suitably used as a driver airbag, a passenger airbag, a curtain airbag, a side airbag, a knee airbag, and a seat airbag, as well as reinforcing cloth, and the like. Therefore, these products are also encompassed by the scope of the present invention. Since the base fabric for airbags of the present invention particularly has excellent heat resistance, the airbag obtained by using the base fabric for airbags of the present invention is preferably used as an airbag that is particularly required to have heat resistance.

More specifically, a driver airbag and reinforcing cloth in the vicinity of the inflator and the sewn portions are preferred. In addition, since the base fabric for airbags of the present invention has particularly excellent packageability, airbags that are particularly required to have packageability are also preferred. More specifically, a driver airbag, a passenger airbag, and a curtain airbag are preferred. The airbag obtained by using the base fabric for airbags of the present invention is more preferably an airbag that is required to have heat resistance and packageability. More specifically, a driver airbag is more preferred.

EXAMPLES

The present invention will be described in more detail below with reference to the Examples; however, the present invention is not limited to the following Examples, and appropriate modifications may certainly be made as long as they are within the concepts stated above and below. Such modifications are all within the technical scope of the present invention. The following are test methods for various properties used in the Examples below.

Boiling Water Shrinkage Percentage

The measurement was performed in accordance with JIS L 1013 (2010) 8.18.1, the dimensional change rate by boiling water (method B). An initial load was applied to a sample, and two points were marked by accurately measuring the length of 500 mm. Thereafter, the initial load was removed, and the sample was immersed in hot water at 100° C. for 30 minutes. Thereafter, the sample was removed, and the water was drained lightly with blotting paper or cloth. After the sample was air-dried, the initial load was applied again, and the length between the two marked points was measured to calculate the dimensional change rate by boiling water (%) by the following equation. The average value of 3 measurements was considered to be the boiling water shrinkage percentage.

$$\Delta L = (L - 500)/500 \times 100$$

$\Delta L$: Boiling water shrinkage percentage (%); L: Length between two points (mm)

Tensile Strength and Elongation at Maximum Force of Yarn

The sample was held loosely with the grip of a tensile tester using tarpaulin as a cushioning material, a load of 1/11.1 of a dtex of the sample for measurement was applied as an initial load (q), and the test was performed under the conditions of a grip interval of 200 mm and a tensile rate of 200 m/min to measure the load and elongation at the time that the sample was cut.

Weave Density of Base Fabric

The measurement was performed in accordance with JIS L 1096 (2010) 8.6.1, method A (JIS method). More specifically, the sample was placed on a flat table, and unnatural wrinkles and tension were removed. Then, for the warp yarn, a region from which 1/10 of the total width was excluded from the edges was divided into 5 almost equal parts, a mark (10 cm) was placed on each part, and the number of yarns within the 10-cm marks was counted. For the weft yarn, 5 locations were marked (10 cm) in the warp direction, and the number of yarns within the 10-cm marks was counted. The number of warp and weft yarns were counted within the 10 cm-marked sections at 5 different locations, and each average value was calculated based on the unit length, which was considered to be the density.

Areal Weight of Base Fabric

The measurement was performed in accordance with JIS L 1096 (2010) 8.3.2. Three test pieces (about 200 mm×200 mm) were taken from the sample, the absolute dry mass (g) of each test piece was weighed, and the mass (g/m$^2$) per 1 m$^2$ was calculated. The average value was considered to be the areal weight.

Stiffness of Base Fabric

The measurement was performed in accordance with JIS L 1096 (2010) 8.21.1, method A (45° C. cantilever method). Five test pieces (about 20 mm×about 150 mm) were taken from the sample in both vertical and horizontal directions, and each test piece was placed on a smooth horizontal surface having a 45° slope at one end so that the short side of the test piece was placed to align with the scale base line. Next, the test piece was allowed to gently slide in the direction towards the slope using an appropriate method, and when the central point of one end of the test piece touched the slope, the position of the other end was read from the scale. The stiffness was represented by the length (mm) in which the test piece was moved, and the measurement was performed for the front and back surfaces of each of the 5 sample pieces.

Edgecomb Resistance of Base Fabric

The measurement was performed according to ASTM D 6479-15.

Packageability of Base Fabric

The measurement was performed according to ASTM D 6478. A test piece with a width of 750±5 mm (weft direction) and a length of 800 mm±5 mm (warp direction) was taken from the sample, a plate with a width of 145 mm and a thickness of 2 mm was placed along the edge of the sample in the warp direction, and the sample was folded along the warp yarns. This procedure was repeated 5 times to make a bellows. The plate was removed, and the folded sample was rotated at 90°. A plate with a width of 95 mm and a thickness of 2 mm was placed along the edge of the sample in the weft direction, and this time, the woven fabric was folded along the weft yarns. This procedure was repeated 7 times to make a bellows. The folded sample was placed in a storage box with an inner dimension at the bottom of 100 mm×150 mm, the bulkiness (thickness) of the folded sample when a specific load was applied from the above was measured, and the packageability (cm$^3$) was calculated by the following equation. The average value of 2 measurements was considered to be the packageability.

$$[T20+T40+T60+ \ldots T180]*100*150/1000 \text{ (cm}^3\text{)}$$

(T$\alpha$: Bulkiness of the sample under the load of $\alpha$N (mm); $\alpha$ is measured in increments of 20.)

Air Permeability of Base Fabric

The air permeability was measured at a pressure of 20 kPa with a high-pressure air permeability measuring device (OEM Systems Co., Ltd.).

Tensile Strength and Elongation at Maximum Force of Base Fabric

The measurement was performed in accordance with JIS L 1096 (2010) 8.14.1, method A (strip method). A test piece was held not loosely with a tensile tester. The test piece having a width of 50 mm was prepared by removing the yarns at the regions 2.5 mm from each side of a cut piece having a width of 55 mm. The test was performed under the conditions of a grip interval of 200 mm, tensile rate of 200 m/min, and cushioning material of rubber, to measure the strength (N) and elongation (%) at the time that the sample was cut. However, those that were cut within 10 mm from the grip or those that were abnormally cut were excluded.

Total Fineness of Yarn Removed from Base Fabric

The warp and weft yarns of the base fabric obtained through a dry finishing process were each fibrillated, and measurement was performed in accordance with JIS L 1013 (2010) 8.3.1, method B (simplified method). Specifically, a sample having a length of 90 cm was accurately taken while a load of 1/11.1 of a dtex of the sample for measurement was applied as an initial load (g), the absolute dry mass was weighed, and a fineness based on corrected weight (dtex) was calculated by the following equation. The average value of 5 measurements was considered to be the total fineness.

$$F0=10000 \times m/L \times (100+R0)/100$$

F0: Fineness based on corrected weight (dtex); L: Sample length (m); m: Absolute dry mass of sample (g); and R0: Official moisture content (%)

Cross-Sectional Shape and Aspect Ratio of Single Yarn of Yarn Removed from Base Fabric The warp and weft yarns of the base fabric obtained through a dry finishing process are each fibrillated to take SEM photographs of their fiber cross-sections, and the lengths of the long and short axes of 10 randomly selected single yarns were measured. The aspect ratio was determined by calculating the average value.

Heat Resistance of Base Fabric

Hot air having a temperature of 280 degrees was injected into the sample perpendicularly from a 10-cm distance for 1100 msec, and the damage of the base fabric after injection was observed. Samples with no holes were marked with A, and samples with holes were marked with B.

Example 1

A plain-weave fabric was woven from nylon 66 original yarns having a fineness of 540 dtex/144f, a tensile strength of 8.6 cN/dtex, an elongation at maximum force of 20%, and a boiling water shrinkage percentage of 9.5% (the monofilament cross-section was round) as weft and warp yarns by using a water-jet loom by setting the weave density to 50 yarns/inch for both weft and warp yarns, and warp tension to 100 cN/yarn. Thereafter, without drying, the fabric was allowed to pass through a hot water shrink tank at 98° C., and then to pass through a dry finishing process in which the first step was adjusted to have a temperature T1 of 120° C., and the second step was adjusted to have a temperature T2 of 125° C., using a two-step suction drum dryer. Table 1 shows the physical properties of the obtained fabric.

Example 2

A plain-weave fabric was woven from nylon 66 original yarns having a fineness of 580 dtex/144f, a tensile strength of 8.3 cN/dtex, an elongation at maximum force of 19%, and a boiling water shrinkage percentage of 9.6% (the monofilament cross-section was round) as weft and warp yarns by using a water-jet loom by setting the weave density to 46.5 yarns/inch for both weft and warp yarns, and warp tension to 110 cN/yarn. Thereafter, without drying, the fabric was allowed to pass through a hot water shrink tank at 98° C., and then to pass through a dry finishing process in which the first step was adjusted to have a temperature T1 of 120° C., and the second step was adjusted to have a temperature T2 of 125° C., using a two-step suction drum dryer. Table 1 shows the physical properties of the obtained fabric.

Example 3

A plain-weave fabric was woven from nylon 66 original yarns having a fineness of 700 dtex/144f, a tensile strength of 8.3 cN/dtex, an elongation at maximum force of 19%, and a boiling water shrinkage percentage of 9.3% (the monofilament cross-section was round) as weft and warp yarns by using a water-jet loom by setting the weave density to 38.5 yarns/inch for both weft and warp yarns, and warp tension to 105 cN/yarn. Thereafter, without drying, the fabric was allowed to pass through a hot water shrink tank at 98° C., and then to pass through a dry finishing process in which the first step was adjusted to have a temperature T1 of 120° C., and the second step was adjusted to have a temperature T2 of 125° C., using a two-step suction drum dryer. Table 1 shows the physical properties of the obtained fabric.

Comparative Example 1

A plain-weave fabric was woven from nylon 66 original yarns having a fineness of 940 dtex/144f, a tensile strength of 8.3 cN/dtex, an elongation at maximum force of 19%, and a boiling water shrinkage percentage of 9.3% (the monofilament cross-section was round) as weft and warp yarns by using a water-jet loom by setting the weave density to 29 yarns/inch for both weft and warp yarns, and warp tension to 110 cN/yarn. Thereafter, without drying, the fabric was allowed to pass through a hot water shrink tank at 98° C., and then to pass through a dry finishing process in which the first step was adjusted to have a temperature T1 of 120° C., and the second step was adjusted to have a temperature T2 of 125° C., using a two-step suction drum dryer. Table 1 shows the physical properties of the obtained fabric.

Comparative Example 2

A plain-weave fabric was woven from nylon 66 original yarns having a fineness of 470 dtex/144f, a tensile strength of 8.3 cN/dtex, an elongation at maximum force of 21%, and a boiling water shrinkage percentage of 9.3% (the monofilament cross-section was round) as weft and warp yarns by using a water-jet loom by setting the weave density to 53 yarns/inch for both weft and warp yarns, and warp tension to 110 cN/yarn. Thereafter, without drying, the fabric was allowed to pass through a hot water shrink tank at 98° C., and then to pass through a dry finishing process in which the first step was adjusted to have a temperature T1 of 120° C., and the second step was adjusted to have a temperature T2 of 125° C., using a two-step suction drum dryer. Table 1 shows the physical properties of the obtained fabric.

Comparative Example 3

A plain-weave fabric was woven from nylon 66 original yarns having a fineness of 470 dtex/72f, a tensile strength of 8.6 cN/dtex, an elongation at maximum force of 20%, and a boiling water shrinkage percentage of 9.5% (the monofilament cross-section was round) as weft and warp yarns by using a water-jet loom by setting the weave density to 55 yarns/inch for both weft and warp yarns, and warp tension to 110 cN/yarn. Thereafter, without drying, the fabric was allowed to pass through a hot water shrink tank at 98° C., and then to pass through a dry finishing process in which the first step was adjusted to have a temperature T1 of 120° C., and the second step was adjusted to have a temperature T2 of 125° C., using a two-step suction drum dryer. Table 1 shows the physical properties of the obtained fabric.

Comparative Example 4

A plain-weave fabric was woven from nylon 66 original yarns having a fineness of 580 dtex/108f, a tensile strength of 8.4 cN/dtex, and an elongation at maximum force of 22.5% (the monofilament cross-section was round) as weft and warp yarns by using an air-jet loom by setting the weave density to 46 yarns/inch for both weft and warp yarns, and warp tension to 140 cN/yarn. Thereafter, scouring was performed with an open soaper at 85° C. for 30 seconds, and drying was performed at 130° C. for 3 minutes with a non-touch dryer. Thereafter, heat setting was performed in a pin tenter heat treatment machine at 180° C. for 30 seconds to maintain the weave density of 46 yarns/2.54 cm, thus obtaining an airbag base fabric. Table 1 shows the physical properties of the obtained fabric.

Comparative Example 5

A plain-weave fabric was woven from nylon 66 original yarns having a fineness of 700 dtex/144f, a tensile strength of 8.3 cN/dtex, an elongation at maximum force of 19%, and a boiling water shrinkage percentage of 9.3% (the monofilament cross-section was round) as weft and warp yarns by using a water-jet loom by setting the weave density to 43 yarns/inch for both weft and warp yarns, and warp tension to 110 cN/yarn. Thereafter, without drying, the fabric was allowed to pass through a hot water shrink tank at 98° C., and then to pass through a dry finishing process in which the first step was adjusted to have a temperature T1 of 120° C., and the second step was adjusted to have a temperature T2 of 125° C., using a two-step suction drum dryer. Table 1 shows the physical properties of the obtained fabric.

The base fabrics of Examples 1 to 3 all had excellent heat resistance. All of these base fabrics also had excellent test results regarding packageability. The present invention, which thus exhibits excellent heat resistance and excellent packageability, is useful as a base fabric for airbags.

The embodiments of the present invention and the Examples are described above; however, the embodiments and the Examples disclosed as above are examples in all respects and are not restrictive. The scope of the present invention is shown in the claims, and encompasses concepts equivalent to the scope of the claims, as well as all modifications within the scope.

INDUSTRIAL APPLICABILITY

According to the present invention, heat resistance and compactness can be achieved simultaneously by optimizing the total fineness, areal weight, air permeability, and slipping performance of the multifilament for use in a base fabric for airbags to be within predetermined ranges.

The invention claimed is:

1. An airbag base fabric comprising a synthetic fiber multifilament having a total fineness of 500 to 750 dtex, the airbag base fabric having an areal weight of 225 to 245 g/m$^2$, air permeability at 20 kPa of 0.2 to 0.8 L/cm$^2$/min, and edgecomb resistance according to the ASTM D 6479-15 method of 300 to 600 N in both warp and weft directions.

2. The airbag base fabric according to claim 1, wherein the airbag base fabric has a weave density of 35 to 55 yarns/2.54 cm in both warp and weft directions.

TABLE 1

| Item | | Unit | Ex. 1 | Ex. 2 | Ex. 3 | Comp. Ex. 1 | Comp. Ex 2 | Comp. Ex 3 | Comp. Ex 4 | Comp. Ex 5 |
|---|---|---|---|---|---|---|---|---|---|---|
| Original yarn fineness | | dtex | 537 | 579 | 700 | 940 | 470 | 470 | 580 | 700 |
| Number of original yarn filaments | | yarn | 144 | 144 | 144 | 144 | 144 | 72 | 108 | 144 |
| Original yarn single yarn fineness | | dtex | 3.7 | 4.0 | 4.9 | 6.5 | 3.3 | 6.5 | 5.4 | 4.9 |
| Original yarn cross sectional shape | | — | Round cross section | Round cross section | Round cross section | Round cross section | Round cross section | Round cross section | Round cross section | Round cross section |
| Original yarn aspect ratio | | — | 1.0 | 1.1 | 1.0 | 1.0 | 1.0 | 1.1 | 1.1 | 1.1 |
| Original yarn tensile strength | | cN/dtex | 8.6 | 8.5 | 8.3 | 83 | 8.3 | 8.6 | 8.4 | 8.3 |
| Elongation at maximum force of original yarn | | % | 22.0 | 22.0 | 19.0 | 19.0 | 21.0 | 20.0 | 22.5 | 19.0 |
| Original yarn boiling water shrinkage percentage | | % | 9.3 | 9.1 | 9.3 | 9.3 | 9.3 | 9.5 | — | 9.3 |
| Weaving loom | | — | WJL | WJL | WJL | WJL | WJL | WJL | AJL | WJL |
| Warp tension in weaving | | cN/yarn | 100 | 110 | 105 | 110 | 110 | 110 | 140 | 110 |
| Shrinkage treatment system | | — | Hot water layer | Hot water layer | Hot water layer | Hot water layer | Hot water layer | Hot water layer | Pin tenter | Hot water layer |
| Treatment temperature | | ° C. | 98 | 98 | 98 | 98 | 98 | 98 | 130 | 98 |
| Areal weight | | g/m$^2$ | 233 | 234 | 233 | 236 | 217 | 225 | 235 | 263 |
| Weave density | warp | yarn/2.54 cm | 49.6 | 46.4 | 38.5 | 29.0 | 53.0 | 55.0 | 46.0 | 43.0 |
| | weft | | 49.4 | 46.5 | 38.5 | 29.0 | 53.0 | 55.0 | 46.0 | 43.0 |
| Tensile strength | warp | N/cm | 838 | 830 | 810 | 731 | 756 | 733 | 803 | 865 |
| | weft | | 857 | 832 | 805 | 744 | 756 | 753 | 804 | 910 |
| Elongation at maximum force | warp | % | 37 | 34 | 33 | 35 | 36 | 35 | 33 | 34 |
| | weft | | 30 | 29 | 28 | 30 | 29 | 29 | 28 | 31 |
| Air permeability | 20 Kpa | L/cm$^2$/min | 0.6 | 0.6 | 0.6 | 1.2 | 0.4 | 1.0 | 0.9 | 1.0 |
| Packageability | | cm$^3$ | 2229 | 2167 | 2050 | 2100 | 2084 | 2380 | 2400 | 2717 |
| Edgecomb resistance | warp | N | 508 | 463 | 471 | 283 | 653 | 484 | 458 | 519 |
| | weft | | 374 | 302 | 369 | 194 | 509 | 427 | 290 | 385 |
| Stiffness | | mm | 98 | 94 | 83 | 80 | 98 | 103 | 105 | 112 |
| Heat resistance | | — | A | A | A | A | B | A | A | A |
| Fineness of yarn removed from the fabric | warp | dtex | 558 | 600 | 724 | 972 | 483 | 482 | 580 | 722 |
| | weft | | 560 | 591 | 713 | 957 | 478 | 477 | 578 | 715 |
| Single yarn aspect ratio of yarn removed from the fabric | warp | — | 1.3 | 1.3 | 1.1 | 1.3 | 1.2 | 1.1 | 1.3 | 1.2 |
| | weft | | 1.2 | 1.3 | 1.2 | 1.1 | 1.3 | 1.2 | 1.3 | 1.2 |

3. The airbag base fabric according to claim 1, wherein the synthetic fiber is at least one synthetic fiber selected from the group consisting of polyamide fibers and polyethylene terephthalate fibers.

4. The airbag base fabric according to claim 1, wherein a single yarn of the synthetic fiber has a cross-sectional shape having an aspect ratio of 1.4 or less.

5. An airbag comprising the airbag base fabric of claim 1.

6. The airbag according to claim 5, which is a non-coated airbag.

7. The airbag base fabric according to claim 1, wherein the synthetic fiber multifilament has a total fineness of 530 to 700 dtex.

8. The airbag base fabric according to claim 1, wherein the airbag base fabric has an areal weight of 230 to 240 g/m$^2$.

9. The airbag base fabric according to claim 1, wherein the airbag base fabric has an areal weight of 232 to 235 g/m$^2$.

10. The airbag base fabric according to claim 1, wherein the airbag base fabric has an air permeability at 20 kPa of 0.3 to 0.7 L/cm$^2$/min.

11. The airbag base fabric according to claim 1, wherein the airbag base fabric has edgecomb resistance according to the ASTM D 6479-15 method of 300 to 550 N in both warp and weft directions.

12. The airbag base fabric according to claim 1, wherein the airbag base fabric has a weave density of 40 to 50 yarns/2.54 cm in both warp and weft directions.

\* \* \* \* \*